(12) United States Patent
Wang et al.

(10) Patent No.: US 12,227,671 B2
(45) Date of Patent: Feb. 18, 2025

(54) POLYPYRROLE-GRAPHENE/POLYURETHANE ANTIFOULING COATING AS WELL AS PREPARATION METHOD AND APPLICATION THEREOF

(71) Applicant: Harbin Engineering University, Harbin (CN)

(72) Inventors: Jun Wang, Harbin (CN); Jiawei Tang, Harbin (CN); Rongrong Chen, Harbin (CN); Qi Liu, Harbin (CN); Jingyuan Liu, Harbin (CN); Jing Yu, Harbin (CN); Jiahui Zhu, Harbin (CN); Gaohui Sun, Harbin (CN); Peili Liu, Harbin (CN)

(73) Assignee: Harbin Engineering University, Harbin (CN)

( * ) Notice: Subject to any disclaimer, the term of this patent is extended or adjusted under 35 U.S.C. 154(b) by 305 days.

(21) Appl. No.: 17/951,125

(22) Filed: Sep. 23, 2022

(65) Prior Publication Data

US 2023/0126942 A1  Apr. 27, 2023

(30) Foreign Application Priority Data

Oct. 26, 2021 (CN) .......................... 202111248332.8

(51) Int. Cl.
*C09D 175/04* (2006.01)
*C09D 5/16* (2006.01)

(52) U.S. Cl.
CPC ......... *C09D 5/1618* (2013.01); *C09D 5/1662* (2013.01); *C09D 175/04* (2013.01)

(58) Field of Classification Search
CPC ... C09D 5/1618; C09D 5/1662; C09D 175/04
USPC ......................................................... 524/590
See application file for complete search history.

(56) References Cited

FOREIGN PATENT DOCUMENTS

| CN | 103304762 A | * | 9/2013 |
| CN | 105273594 A | * | 1/2016 |
| CN | 109867765 A | * | 6/2019 |

* cited by examiner

*Primary Examiner* — Kelechi C Egwim
(74) *Attorney, Agent, or Firm* — Bayramoglu Law Offices LLC

(57) ABSTRACT

A polypyrrole-graphene/polyurethane antifouling coating as well as a preparation method and an application thereof are provided. The polypyrrole-graphene/polyurethane antifouling coating includes component A and component B, wherein the component A mainly includes the following raw materials in parts by weight: 500 parts of group-hydrolyzable polyurethane prepolymer, 25-50 parts of bentonite, 25-50 parts of titanium dioxide, 60-120 parts of zinc oxide, 15-30 parts of talcum powder, and 15-30 parts of polypyrrole-graphene nanofiller; and the component B mainly includes the following raw materials in parts by weight: 5-7 parts of leveling agent, 5-7 parts of defoamer, 6-15 parts of chain extender, 10-25 parts of silane coupling agent, and 1-2 parts of catalyst. The two-component polyurethane coating of the present invention has relatively good adhesion, collision resistance and cracking resistance, and the antifouling property and the antifouling durability can be improved.

14 Claims, No Drawings

POLYPYRROLE-GRAPHENE/POLYURETHANE ANTIFOULING COATING AS WELL AS PREPARATION METHOD AND APPLICATION THEREOF

CROSS REFERENCE TO THE RELATED APPLICATIONS

This application is based upon and claims priority to Chinese Patent Application No. 202111248332.8, filed on Oct. 26, 2021, the entire contents of which are incorporated herein by reference.

TECHNICAL FIELD

The present invention relates to the technical field of antifouling coating, in particular to a polypyrrole-graphene/polyurethane antifouling coating and a preparation method thereof.

BACKGROUND

An ocean buoy is a kind of navigation mark floating on the water surface. It can measure the wind, pressure, temperature, humidity, visibility in the atmosphere, as well as the wave, current, water temperature, salinity and other parameters in the hydrological parameters. However, as the ocean buoy fluctuates with the waves for a long time and is affected by the light, marine organisms rapidly proliferate on its surface and become sessile, thus affecting the balance and stability of the buoy. If the ocean buoy is of a metal structure, it will suffer accelerated corrosion, affecting its function and service life. Moreover, the antifouling coating of the buoy should not only achieve an antifouling effect, but also further satisfy the requirements of collision resistance and excellent weatherability.

Polyurethane protective coating has better impact resistance and collision resistance, but its antifouling property is not favorable.

Chinese Patent Publication No. CN105273594A (Patent No. 201510735804.0) discloses a silicone polyurethane/polyurea antifouling material bonded with an antifouling factor as well as a preparation and an application thereof, wherein the silicone polyurethane/polyurea antifouling material bonds an antifouling factor to a polyurethane chain, so that an antifouling ability is enhanced.

Chinese Patent Publication No. CN109867765A (Patent No. 201910150377.8) discloses long-acting sustained-release biodegradable antifouling polyurethane and a preparation method thereof, wherein the antifouling polyurethane binds modified thiazolidinedione to a polyurethane chain, and makes the polyurethane have an antibacterial and antifouling ability.

Chinese Patent Publication No. CN103304762A (Patent No. 201310270856.6) discloses a method for preparing organosilicon quaternary ammonium salt modified polyurethane resin for marine antifouling coating, wherein the organosilicon quaternary ammonium salt modified polyurethane resin for a marine antifouling coating is prepared by mixing bis(hydroxy)-terminated organosilicon quaternary ammonium salt and polyether polyol with diisocyanate in a solvent and adding a curing agent; the organosilicon quaternary ammonium salt modified polyurethane resin is used as a film-forming material for marine antifouling coatings in combination with the dual effects of low surface energy as well as disinfection and sterilization, which can not only inhibit the adsorption of marine organisms, but also kill bacteria adsorbed on the hull surface through the quaternary ammonium salt.

A new polyurethane antifouling coating is developed from different inventive concepts in the present invention.

SUMMARY

In view of this, the present invention is intended to provide a polypyrrole-graphene/polyurethane antifouling coating for improving an antifouling property and antifouling durability, as well as a preparation method and an application thereof.

The technical solutions are as follows:

In the first aspect, the polypyrrole-graphene/polyurethane antifouling coating of the present invention includes component A and component B, wherein the component A mainly includes the following raw materials in parts by weight:

500 parts of group-hydrolyzable polyurethane prepolymer, 25-50 parts of bentonite, 25-50 parts of titanium dioxide, 60-120 parts of zinc oxide, 15-30 parts of talcum powder, and 15-30 parts of polypyrrole-graphene nanofiller; and the component B mainly includes the following raw materials in parts by weight:

5-7 parts of leveling agent, 5-7 parts of defoamer, 6-15 parts of chain extender, 10-25 parts of silane coupling agent, and 1-2 parts of catalyst.

Further, the group-hydrolyzable polyurethane prepolymer is prepared by the following method:

adding xylene and tetrahydrofuran to a four-necked flask with a mechanical stirring device, a thermometer, a constant-pressure dropping funnel and a condenser pipe, and putting carboxyl-containing small molecule diol, heating the system to 50-60° C. and dripping isophorone diisocyanate (IPDI) therein, mixing the system evenly and heating to 80-85° C., and maintaining the temperature for 0.5-1 h after the system reacts to a clarified status; cooling the system to 50-60° C., adding dehydrated polyether polyol to the system, mixing the system evenly and heating to 80-85° C., and keeping the reaction for 1.5-2.5 h; when a system viscosity increases obviously and a —NCO content decreases to 0.5%, cooling the system to 50-60° C., dripping the IPDI, mixing the system evenly and heating to 80-85° C. again, and keeping the reaction for 2-3 h; putting pyridine-triphenylborane in batches, keeping a reaction temperature at 70-85° C., putting a next batch of PTPB after the reaction is complete and the system becomes clear from turbid, and keeping the reaction for 1-2.5 h; dripping polyisocyanates after final feeding is completed, and keeping the temperature at 80-85° C. for 2-3 h until the reaction is completed.

Further, the polypyrrole-graphene nanofiller is prepared by the following method:

dispersing ammonium persulfate and cetyl trimethyl ammonium bromide in a hydrochloric acid solution at a molar ratio of 2.5-4:1, ultrasonically dispersing graphene in the resulting solution evenly, dripping pyrrole monomer under stirring, wherein a mass ratio of the graphene to the pyrrole is 1/50-1/200, and the reactant changing from milky white to black blue and eventually to black; upon completion of the reaction, filtrating the solution, washing filter cakes with distilled water and ethanol, and performing vacuum drying to obtain the polypyrrole-graphene nanofiller.

Further, in use, the component A and the component B are mixed evenly at a mass ratio of 30-45:1, heated and cured.

Further, the silane coupling agent is one or more of γ-aminopropyl triethoxysilane, γ-aminopropyl trimethoxy silane, bis-(γ-trimethoxysilylpropyl)amine, N-phenyl-γ-aminopropyl trimethoxy silane, N-phenyl-γ-aminopropyl triethoxysilane, N-butyl-γ-aminopropyl trimethoxy silane and N-butyl-γ-aminopropyl triethoxysilane.

Further, the chain extender is a liquid amine chain extender.

Further, the catalyst is one or more of dibutyltin dilaurate and dibutyltin diacetate.

In the second aspect, a method for preparing the polypyrrole-graphene/polyurethane antifouling coating described in any above-mentioned solution includes the following steps:
S1, adding raw materials of component A to a high-speed dispersion machine, and performing high-speed dispersion for 15-45 min to prepare the component A; and
S2, adding raw materials of component B to the high-speed dispersion machine, and performing high-speed dispersion for 15-30 min to prepare the component B.

In the third aspect, an application of the polypyrrole-graphene/polyurethane antifouling coating described in any above-mentioned solution in ocean buoys.

The present invention has the following beneficial effects:
(1) The polypyrrole-graphene nanofiller is graphene-loaded nano polypyrrole functional filler. On one hand, the excellent photothermal inhibition of fouling biological adhesion can be achieved through the collaboration of graphene and nano polypyrrole. The photothermal effect on the coating surface will accelerate the water loss on the coating surface and inner layer. By loading nano polypyrrole with graphene (Gr), the lamellar material can reduce the penetration of water into the coating and reduce the hydrolysis of an antifouling group in the inner layer without affecting the photothermal effect. On the other hand, the polypyrrole-graphene filler added can increase the mechanical properties and environmental alternation resistance of the polyurethane coating, and prolong the service life.
(2) The group-hydrolyzable polyurethane prepolymer bonds PTPB (i.e., pyridine-triphenylborane) to the polyurethane chain by chemical crosslinking to form a hydrolyzable antifouling group, and controls the release of antifouling substances through slow hydrolysis to enhance the antifouling ability of the coating. Compared with the direct addition of an antifouling agent for physical blending, the technology improves the ability of the polyurethane coating to resist fouling adhesion, and can control the release of the antifouling group to enhance the service life of the antifouling coating.
(3) PTPB as a broad-spectrum antifouling agent is widely applied in marine antifouling coatings. The antifouling group is chemically bonded to the polyurethane chain, which can not only give the polyurethane an antifouling property, but also avoid the antifouling property degradation caused by an uneven release rate of antifouling agent as a result of simple blending. However, the grafting technology of PTPB on the polyurethane chain has not been disclosed.
(4) The polypyrrole has a photothermal effect and is used to accelerate the surface water loss after the facility is removed from the water in the present invention, thereby increasing the operating window period. The polypyrrole-graphene nanofiller is prepared by loading polypyrrole with Gr. Without affecting the photothermal effect of polypyrrole, the penetration of seawater into the inner coating layer is slowed down through the lamellar structure of graphene, so that the antifouling group in the inner layer is protected, and group hydrolysis is reduced, thereby achieving the purpose of controlling the group hydrolysis rate.
(5) The two-component polyurethane coating of the present invention has relatively good adhesion, collision resistance and cracking resistance, and the reliability of the coating can be ensured after the equipment is removed from the water. Moreover, its excellent adhesion can make the coating act directly on the equipment surface without intermediate connecting paint. It is mixed proportionally when used, and easy to use.

DETAILED DESCRIPTION OF THE EMBODIMENTS

The present invention will be described below in detail in combination with specific embodiments, but the application and purpose of these exemplary implementation modes are only to illustrate the present invention, and do not constitute any form of limitation to the actual protection scope of the present invention, nor limit the protection scope of the present invention thereinto.

It should be noted that there is no special limitation to specific categories of some additives in the component A or component B, and those skilled in the art may select the corresponding additives commonly used in the art. For example, the leveling agent may be acrylics leveling agent, and the acrylics leveling agent may be polyethyl acrylate, polybutyl acrylate, etc.; or the leveling agent may be one or more of commercially available Germany BYK-R-605 and BYK-R-606, the defoamer may be silicone defoamer, and the silicone defoamer may be polydimethylsiloxane, etc.; or the defoamer may be commercially available Elementis DAPRO-AP-7010, etc., as long as the corresponding additives can play a corresponding role.

Example 1

The example provides a method for preparing polypyrrole-graphene nanofiller, including the following steps:
3.42 g of ammonium persulfate (APS) and 1.82 g of cetyl trimethyl ammonium bromide (CATB) were dispersed in 500 ml of 4.92 g/L hydrochloric acid solution at a molar ratio of 3:1, 0.02 g of graphene was ultrasonically dispersed in the resulting solution evenly, 4.03 g of pyrrole monomer was dripped under stirring, and the reactant changed from milky white to black blue and eventually to black; upon completion of the reaction after 6 h, the solution was filtrated, filter cakes were washed with distilled water and ethanol, and vacuum drying was performed to obtain polypyrrole-graphene nanofiller.

Example 2

The example provides a method for preparing polypyrrole-graphene nanofiller, including the following steps:
27.36 g of APS and 10.92 g of CATB were dispersed in 3 L of 4.92 g/L hydrochloric acid solution at a molar ratio of 4:1, 0.48 g of graphene was ultrasonically dispersed in the resulting solution evenly, 24.18 g of pyrrole monomer was dripped under stirring, and the reactant changed from milky white to black blue and eventually to black; upon completion of the reaction after 6 h, the solution was filtrated, filter cakes were washed with distilled water and ethanol, and vacuum drying was performed to obtain polypyrrole-graphene nanofiller.

Example 3

The example provides a method for preparing group-hydrolyzable polyurethane prepolymer, including the following steps:

100 g of xylene and 25 g of tetrahydrofuran were added to a four-necked flask with a mechanical stirring device, a nitrogen protection device, a constant-pressure dropping funnel, a thermometer and a condenser pipe, and 13.4 g of 2,2-Bis(hydroxymethyl) propionic acid was put into the flask, the system was heated to 50° C. and 44.46 g of IPDI was dripped therein, the system was mixed evenly and heated to 80-85° C., and the temperature was maintained for 0.5 h after the system reacted to a clarified status. The system was cooled to 50° C., 200 g of polytetramethylene-ether-glycol (with a molecular weight of 1,000) was added to the system, the system was mixed evenly and heated to 80-85° C., and reacted for 2 h. When a system viscosity increased obviously and a —NCO content decreased to 0.5%, the system was cooled to 50° C., 100 g of xylene and 25 g of tetrahydrofuran were added and 44.46 g of IPDI was dripped, and the system was mixed evenly and heated to 80-85° C. again, and reacted for 2.5 h. Totally 32 g of PTPB was put 4 times, 8 g every time, a reaction temperature was controlled at 80° C., 80° C., 83° C. and 83° C. respectively, and a feeding interval was 1.5 h, 2 h and 2 h respectively. After the last feeding and the reaction for 2.5 h, 50 g of xylene was added and 50 g of hexamethylene diisocyanate trimer (HDI trimer) was dripped, and the system was kept at 80° C. for 1.5 h. Unreacted solids were filtered out and a —NCO content was determined.

Example 4

The example provides a method for preparing group-hydrolyzable polyurethane prepolymer, including the following steps:

100 g of xylene and 25 g of tetrahydrofuran were added to a four-necked flask with a mechanical stirring device, a nitrogen protection device, a constant-pressure dropping funnel, a thermometer and a condenser pipe, and 13.4 g of 2,2-Bis(hydroxymethyl) propionic acid was put into the flask, the system was heated to 50° C. and 44.46 g of IPDI was dripped therein, the system was mixed evenly and heated to 80-85° C., and the temperature was maintained for 0.5 h after the system reacted to a clarified status. The system was cooled to 50° C., 200 g of polytetramethylene-ether-glycol (with a molecular weight of 1,000) was added to the system, the system was mixed evenly and heated to 80-85° C., and reacted for 2 h. When a system viscosity increased obviously and a —NCO content decreased to 0.5%, the system was cooled to 50° C., 100 g of xylene and 25 g of tetrahydrofuran were added and 44.46 g of IPDI was dripped, and the system was mixed evenly and reheated to 80-85° C., and reacted for 2.5 h. Totally 24 g of PTPB was put 4 times, 6 g every time, reaction temperatures were controlled at 80° C., and a feeding interval was 2 h. After the last feeding, when a solid content in the system did not change, 50 g of xylene was added and 50 g of IPDI trimer was dripped, the system was kept at 80° C. for 1.5 h. Unreacted solids were filtered out and a —NCO content was determined.

Example 5

The example provides a method for preparing group-hydrolyzable polyurethane prepolymer, including the following steps:

100 g of xylene and 25 g of tetrahydrofuran were added to a four-necked flask with a mechanical stirring device, a nitrogen protection device, a constant-pressure dropping funnel, a thermometer and a condenser pipe, and 13.4 g of 2,2-Bis(hydroxymethyl) propionic acid was put into the flask, the system was heated to 50° C. and 44.46 g of IPDI was dripped therein, the system was mixed evenly and heated to 80-85° C., and the temperature was maintained for 0.5 h after the system reacted to a clarified status. The system was cooled to 50° C., 200 g of polytetramethylene-ether-glycol (with a molecular weight of 1,000) was added to the system, the system was mixed evenly and heated to 80-85° C., and reacted for 2 h. When a system viscosity increased obviously and a —NCO content decreased to 0.5%, the system was cooled to 50° C., 100 g of xylene and 25 g of tetrahydrofuran were added and 44.46 g of IPDI was dripped, and the system was mixed evenly and reheated to 80-85° C., and reacted for 2.5 h. Totally 32 g of PTPB was put 4 times, 8 g every time, a reaction temperature was controlled at 80° C., 80° C., 83° C. and 83° C. respectively, and a feeding interval was 1.5 h, 2 h and 2 h respectively. After the last feeding, 50 g of xylene was added; upon completion of reaction for 2.5 h, unreacted solids were filtered out and a —NCO content was determined.

Example 6

The example provides a polypyrrole-graphene/polyurethane antifouling coating, including component A and component B;

the component A contained 500 parts of group-hydrolyzable polyurethane prepolymer, 25 parts of bentonite, 25 parts of titanium dioxide, 60 parts of zinc oxide, 15 parts of talcum powder in example 3, and 15 parts of polypyrrole-graphene nanofiller in example 1; these raw materials were added to a high-speed dispersion machine and dispersed at a high speed for 30 min to prepare the component A; and the component B contained 5 parts of leveling agent, 5 parts of defoamer, 6 parts of chain extender, 10 parts of silane coupling agent, and 1 part of catalyst; these raw materials were added to the high-speed dispersion machine and dispersed at a high speed for 15 min to prepare the component B.

When in use, the component A and the component B were mixed evenly at a mass ratio of 30:1, heated and cured.

Example 7

The example provides a polypyrrole-graphene/polyurethane antifouling coating, including component A and component B;

the component A contained 500 parts of group-hydrolyzable polyurethane prepolymer, 35 parts of bentonite, 35 parts of titanium dioxide, 84 parts of zinc oxide, 21 parts of talcum powder in example 4, and 21 parts of polypyrrole-graphene nanofiller in example 1; these raw materials were added to a high-speed dispersion machine and dispersed at a high speed for 35 min to prepare the component A; and the component B contained 6 parts of leveling agent, 6 parts of defoamer, 12 parts of chain extender, 20 parts of silane coupling agent, and 2 parts of catalyst; these raw materials were added to the high-speed dispersion machine and dispersed at a high speed for 20 min to prepare the component B.

When in use, the component A and the component B were mixed evenly at a mass ratio of 40:1, heated and cured.

Example 8

The example provides a polypyrrole-graphene/polyurethane antifouling coating, including component A and component B;

the component A contained 500 parts of group-hydrolyzable polyurethane prepolymer, 50 parts of bentonite, 50 parts of titanium dioxide, 120 parts of zinc oxide, 30 parts of talcum powder in example 5, and 30 parts of polypyrrole-graphene nanofiller in example 2; these raw materials were added to a high-speed dispersion machine and dispersed at a high speed for 35 min to prepare the component A; and the component B contained 7 parts of leveling agent, 7 parts of defoamer, 15 parts of chain extender, 25 parts of silane coupling agent, and 2 parts of catalyst; these raw materials were added to the high-speed dispersion machine and dispersed at a high speed for 20 min to prepare the component B.

When in use, the component A and the component B were mixed evenly at a mass ratio of 45:1, heated and cured.

Test 1:

The polypyrrole-graphene/polyurethane antifouling coating used had a lethal effect on amphora on the coating surface. It is summarized as shown in Table 1:

TABLE 1

| Sample | Average fatality rate |
|---|---|
| Blank sample | 0% |
| Example 6 | 38.87% |
| Example 7 | 44.11% |
| Example 8 | 47.95% |

Test 2:

Upon the board hanging test in the sea area in Dachangshan Island, Changhai County, Dalian (with a period of 2 months), compared with the existing epoxy coating control sample, the biological fouling was less on the polypyrrole-graphene/polyurethane antifouling coating and the antifouling effect was better; compared with the polyurethane coating control sample without polypyrrole-graphene nanofiller, the fouling organisms were less on the polypyrrole-graphene/polyurethane antifouling coating and the antifouling effect was better.

One month later, the same test samples were observed in the same sea area. The polypyrrole-graphene/polyurethane antifouling coating was in sharp contrast with other control samples, and had a better antifouling ability and the best antifouling effect.

The foregoing are only specific descriptions of the feasible embodiments of the present invention, but not to limit the protection scope of the present invention. Any equivalent embodiments or changes made without departing from the art spirit of the present invention should be regarded as the protection scope of the present invention.

What is claimed is:

1. A polypyrrole-graphene/polyurethane antifouling coating, comprising a first component and a second component, wherein the first component comprises the following raw materials in parts by weight:

500 parts of a group-hydrolyzable polyurethane prepolymer, 25 parts-50 parts of bentonite, 25 parts-50 parts of titanium dioxide, 60 parts-120 parts of zinc oxide, 15 parts-30 parts of a talcum powder, and 15 parts-30 parts of a polypyrrole-graphene nanofiller, wherein the group-hydrolyzable polyurethane prepolymer is grafted with pyridine-triphenylborane; and the second component comprises the following raw materials in parts by weight:

5 parts-7 parts of a leveling agent, 5 parts-7 parts of a defoamer, 6 parts-15 parts of a chain extender, 10 parts-25 parts of a silane coupling agent, and 1 part-2 parts of a catalyst.

2. The polypyrrole-graphene/polyurethane antifouling coating of claim 1, wherein the group-hydrolyzable polyurethane prepolymer is prepared by the following method:

adding xylene and tetrahydrofuran to a four-necked flask with a mechanical stirring device, a thermometer, a constant-pressure dropping funnel, and a condenser pipe, and adding a carboxyl-containing diol to obtain a system, heating the system to 50° C.-60° C. and dripping isophorone diisocyanate (IPDI) into the system to obtain a first mixed system, mixing the first mixed system and heating the first mixed system to a temperature of 80° C.-85° C., and maintaining the temperature for 0.5 h-1 h after the first mixed system reaches to a clarified status;

cooling the first mixed system to 50° C.-60° C., adding dehydrated polyether polyol to the first mixed system to obtain a second mixed system, mixing the second mixed system and heating the second mixed system to 80-85° C., and keeping a first reaction for 1.5 h-2.5 h; when a viscosity of the second mixed system increases and a —NCO content decreases to 0.5%, cooling the second mixed system to 50° C.-60° C., dripping the IPDI to the second mixed system to obtain a third mixed system, mixing the third mixed system and heating the third mixed system to 80° C.-85° C., and keeping a second reaction for 2 h-3 h;

adding the pyridine-triphenylborane (PTPB) in first batches to the third mixed system to obtain a fourth mixed system, keeping a reaction temperature at 70° C.-85° C., adding a second batch of the PTPB after a third reaction is completed and the fourth mixed system becomes clear from turbid, and keeping a fourth reaction for 1 h-2.5 h;

dripping polyisocyanate after final feeding is completed, and keeping the temperature at 80° C.-85° C. for 2 h-3 h until a fifth reaction is completed.

3. The polypyrrole-graphene/polyurethane antifouling coating of claim 1, wherein the polypyrrole-graphene nanofiller is prepared by the following method:

dispersing ammonium persulfate and cetyl trimethyl ammonium bromide in a hydrochloric acid solution at a molar ratio of (2.5-4):1 to obtain a first resulting solution, ultrasonically dispersing a graphene in the first resulting solution to obtain a second resulting solution, dripping a pyrrole monomer under stirring to the second resulting solution to obtain a third resulting solution, wherein a mass ratio of the graphene to the pyrrole monomer is 1/50-1/200, and the third resulting solution changes from milky white to black blue and eventually to black; upon completion, filtrating the third resulting solution, washing filter cakes with distilled water and ethanol, and performing a vacuum drying to obtain the polypyrrole-graphene nanofiller.

4. The polypyrrole-graphene/polyurethane antifouling coating of claim 1, wherein in use, the first component and the second component are mixed at a mass ratio of (30-45):1, heated and cured.

5. The polypyrrole-graphene/polyurethane antifouling coating of claim 1, wherein the silane coupling agent is at least one of γ-aminopropyl triethoxysilane, γ-aminopropyl trimethoxy silane, bis-(γ-trimethoxysilylpropyl)amine, N-phenyl-γ-aminopropyl trimethoxy silane, N-phenyl-γ-aminopropyl triethoxysilane, N-butyl-γ-aminopropyl trimethoxy silane, and N-butyl-γ-aminopropyl triethoxysilane.

6. The polypyrrole-graphene/polyurethane antifouling coating of claim 1, wherein the chain extender is a liquid amine chain extender.

7. The polypyrrole-graphene/polyurethane antifouling coating of claim 1, wherein the catalyst is at least one of dibutyltin dilaurate and dibutyltin diacetate.

8. A method for preparing polypyrrole-graphene/polyurethane antifouling coating, wherein the polypyrrole-graphene/polyurethane antifouling coating, comprise a first component and a second component, wherein the first component comprises the following raw materials in parts by weight:
500 parts of a group-hydrolyzable polyurethane prepolymer, 25 parts-50 parts of bentonite, 25 parts-50 parts of titanium dioxide, 60 parts-120 parts of zinc oxide, 15 parts-30 parts of a talcum powder, and 15 parts-30 parts of a polypyrrole-graphene nanofiller, wherein the group-hydrolyzable polyurethane prepolymer is grafted with pyridine-triphenylborane; and
the second component comprises the following raw materials in parts by weight:
5 parts-7 parts of a leveling agent, 5 parts-7 parts of a defoamer, 6 parts-15 parts of a chain extender, 10 parts-25 parts of a silane coupling agent, and 1 part-2 parts of a catalyst, the method comprising the following steps:
S1, adding the raw materials of the first component to a high-speed dispersion machine, and performing a first high-speed dispersion for 15 min-45 min to prepare the first component; and
S2, adding the raw materials of the second component to the high-speed dispersion machine, and performing a second high-speed dispersion for 15 min-30 min to prepare the second component.

9. The method for preparing the polypyrrole-graphene/polyurethane antifouling coating of claim 8, wherein the group-hydrolyzable polyurethane prepolymer is prepared by the following method:
adding xylene and tetrahydrofuran to a four-necked flask with a mechanical stirring device, a thermometer, a constant-pressure dropping funnel, and a condenser pipe, and adding a carboxyl-containing diol to obtain a system,
heating the system to 50° C.-60° C. and dripping isophorone diisocyanate (IPDI) into the system to obtain a first mixed system, mixing the first mixed system and heating the first mixed system to a temperature of 80° C.-85° C., and maintaining the temperature for 0.5 h-1 h after the first mixed system reaches to a clarified status;
cooling the first mixed system to 50° C.-60° C., adding dehydrated polyether polyol to the first mixed system to obtain a second mixed system, mixing the second mixed system and heating the second mixed system to 80-85° C., and keeping a first reaction for 1.5 h-2.5 h; when a viscosity of the second mixed system increases and a —NCO content decreases to 0.5%, cooling the second mixed system to 50° C.-60° C., dripping the IPDI to the second mixed system to obtain a third mixed system, mixing the third mixed system and heating the third mixed system to 80° C.-85° C., and keeping a second reaction for 2 h-3 h;
adding the pyridine-triphenylborane (PTPB) in first batches to the third mixed system to obtain a fourth mixed system, keeping a reaction temperature at 70° C.-85° C., adding a second batch of the PTPB after a third reaction is completed and the fourth mixed system becomes clear from turbid, and keeping a fourth reaction for 1 h-2.5 h;
dripping polyisocyanate after final feeding is completed, and keeping the temperature at 80° C.-85° C. for 2 h-3 h until a fifth reaction is completed.

10. The method for preparing the polypyrrole-graphene/polyurethane antifouling coating of claim 8, wherein the polypyrrole-graphene nanofiller is prepared by the following method:
dispersing ammonium persulfate and cetyl trimethyl ammonium bromide in a hydrochloric acid solution at a molar ratio of (2.5-4):1 to obtain a first resulting solution,
ultrasonically dispersing a graphene in the first resulting solution to obtain a second resulting solution,
dripping a pyrrole monomer under stirring to the second resulting solution to obtain a third resulting solution, wherein a mass ratio of the graphene to the pyrrole monomer is 1/50-1/200, and the third resulting solution changes from milky white to black blue and eventually to black; upon completion, filtrating the third resulting solution, washing filter cakes with distilled water and ethanol, and performing a vacuum drying to obtain the polypyrrole-graphene nanofiller.

11. The method for preparing the polypyrrole-graphene/polyurethane antifouling coating of claim 8, wherein in use, the first component and the second component are mixed at a mass ratio of (30-45):1, heated and cured.

12. The method for preparing the polypyrrole-graphene/polyurethane antifouling coating of claim 8, wherein the silane coupling agent is at least one of γ-aminopropyl triethoxysilane, γ-aminopropyl trimethoxy silane, bis-(γ-trimethoxysilylpropyl)amine, N-phenyl-γ-aminopropyl trimethoxy silane, N-phenyl-γ-aminopropyl triethoxysilane, N-butyl-γ-aminopropyl trimethoxy silane, and N-butyl-γ-aminopropyl triethoxysilane.

13. The method for preparing the polypyrrole-graphene/polyurethane antifouling coating of claim 8, wherein the chain extender is a liquid amine chain extender.

14. The method for preparing the polypyrrole-graphene/polyurethane antifouling coating of claim 8, wherein the catalyst is at least one of dibutyltin dilaurate and dibutyltin diacetate.

* * * * *